US007739172B2

(12) United States Patent
Voudrie

(10) Patent No.: US 7,739,172 B2
(45) Date of Patent: *Jun. 15, 2010

(54) STOP-LOSS SYSTEM ENABLING A PLURALITY OF INVESTMENT PROTECTION LEVELS

(76) Inventor: Jeffrey O. Voudrie, 208 Sunset Dr., Ste 409, Johnson City, TN (US) 37604

( * ) Notice: Subject to any disclaimer, the term of this patent is extended or adjusted under 35 U.S.C. 154(b) by 1032 days.

This patent is subject to a terminal disclaimer.

(21) Appl. No.: 10/919,426

(22) Filed: Aug. 16, 2004

(65) Prior Publication Data
US 2005/0273410 A1 Dec. 8, 2005

Related U.S. Application Data

(63) Continuation of application No. 10/859,859, filed on Jun. 3, 2004.

(51) Int. Cl.
*G06Q 4/00* (2006.01)
(52) U.S. Cl. ........................... 705/36 R; 705/37
(58) Field of Classification Search ................ 705/1.35, 705/36, 36 R, 37
See application file for complete search history.

(56) References Cited

U.S. PATENT DOCUMENTS

| 5,819,238 | A  | * | 10/1998 | Fernholz ................ 705/36 R |
| 6,064,985 | A  | * | 5/2000  | Anderson ............... 705/36 R |
| 7,155,510 | B1 | * | 12/2006 | Kaplan ..................... 709/224 |
| 2002/0103742 | A1 | * | 8/2002 | Billings et al. ............ 705/37 |
| 2002/0156718 | A1 | * | 10/2002 | Olsen et al. ............... 705/37 |
| 2003/0065598 | A1 | * | 4/2003 | Bunda ...................... 705/36 |
| 2006/0010066 | A1 | * | 1/2006 | Rosenthal et al. ......... 705/37 |

OTHER PUBLICATIONS

Anonymous; "The impact of institutional investors on OECD financial markets"; Financial Market Trends (France), n68; Nov. 1997; pp. 1-30.*
Fortune, Peter; New England Economic Review; "Margin Requirements, Margin Loans, and Margin Rates: Practice and Principles. (Statistical Data Included)"; Sep.-Oct. 2001; pp. 1-32.*
Garber, Peter M. and Spencer, Michael G.; International Monetary Fund Staff Papers, V42, n3; "Foreign exchange hedging and the interest rate defense"; Sep. 1995; pp. 1-18.*

* cited by examiner

*Primary Examiner*—Ella Colbert
(74) *Attorney, Agent, or Firm*—White-Welker & Welker, LLC

(57) ABSTRACT

The present invention discloses the use of an improved stop-loss and trailing stop-loss order system. Existing systems only allow one stop-loss or trailing stop-loss value to be used resulting in the complete liquidation of the investment once the value is breached. The improved system of the present invention involves the use of two or more different protection levels per security, some of which may adjust based on the current share price of an investment and some which remain static. Thus, the stop-loss and trailing stop-loss system of the present invention allows for an investment to be liquidated over time in an incremental fashion as opposed to complete liquidation of an investment at one time. The improved stop-loss and trailing stop-loss order system is completely adjustable based on the risk tolerance of the client and is based on an amount instead of a percentage. In a preferred embodiment is used in conjunction with an electronic portfolio management system.

4 Claims, 9 Drawing Sheets

450

411  451  452                              460  461  462  463  464  465

[Client Buy List]        Y——Accounts——Y           Y———Assets———Y

| Account | Security | Target Amount | Actual Amount | Amount To Buy | Excess Cash | RT | Category Actual Under Target | Class Actual Under Target | Security Actual Under Target | Amount To Buy Exceeds Minimum | MA Above CloseB | On Watch List | Alerted |
|---|---|---|---|---|---|---|---|---|---|---|---|---|---|
| - Ira Regular | American Growth Fund of America Class F | 40,678.73 | 19,904.48 | 20,774.25 | 230,523.00 | Medium | | | | | | | |
| - Ira Regular | American Strategic Income Port Inc Ii | 22,174.96 | 0.00 | 22,174.96 | 230,523.00 | Medium | | | | | | | |
| - Ira Regular | Calamos Growth Classa | 46,936.99 | 4,375.63 | 42,561.36 | 230,523.00 | Medium | | | | | | | |
| - Ira Regular | Clipper | 26,076.11 | 24,409.21 | 1,666.90 | 230,523.00 | Medium | | | | | | | |
| - Ira Regular | Cohen_Steers Prem Income Rty Fd Inc | 6,981.00 | 0.00 | 6,981.00 | 230,523.00 | Medium | | | | | | | |
| - Ira Regular | Cohen_Steers Realty Shares | 6,775.68 | 0.00 | 6,775.68 | 230,523.00 | Medium | | | | | | | |
| - Ira Regular | Cohen_Steers R_t_Pfd Income Fd Inc | 6,981.00 | 0.00 | 6,981.00 | 230,523.00 | Medium | | | | | | | |
| - Ira Regular | Fidelity New Markets Income | 14,783.30 | 0.00 | 14,783.30 | 230,523.00 | Medium | | | | | | | |
| - Ira Regular | First Eagle Overseas Class A | 41,721.77 | 88,067.03 | 0.00 | 230,523.00 | Medium | | | | | | | |
| - Ira Regular | Hotchkis_Wiley Midcap Value Cl A | 26,076.11 | 16,994.97 | 9,081.14 | 230,523.00 | Medium | | | | | | | |
| - Ira Regular | Hotchkis and Wiley Large Cap Value | 26,076.11 | 0.00 | 26,076.11 | 230,523.00 | Medium | | | | | | | |
| - Ira Regular | Inland SouthEastern REIT | 69,810.05 | 0.00 | 69,810.05 | 230,523.00 | Medium | | | | | | | |
| - Ira Regular | iShares MSCI EAFE Index | 20,860.89 | 20,775.00 | 85.89 | 230,523.00 | Medium | | | | | | | |
| - Ira Regular | iShares MSCI Emerging Mkts | 15,645.66 | 0.00 | 15,645.66 | 230,523.00 | Medium | | | | | | | |
| - Ira Regular | iShares Russell 2000 | 36,506.55 | 0.00 | 36,506.55 | 230,523.00 | Medium | | | | | | | |
| - Ira Regular | Ishares Tr Dow Jones U S Real Estate | 13,551.36 | 0.00 | 13,551.36 | 230,523.00 | Medium | | | | | | | |
| - Ira Regular | Ishares Tr SP Midcap 400 Index Fd | 57,367.44 | 0.00 | 57,367.44 | 230,523.00 | Medium | | | | | | | |
| - Ira Regular | Marsico Focus | 21,903.93 | 0.00 | 21,903.93 | 230,523.00 | Medium | | | | | | | |
| - Ira Regular | PIMCO CCM Emerging Cos Inst | 41,721.77 | 0.00 | 41,721.77 | 230,523.00 | Medium | | | | | | | |
| - Ira Regular | Pimco Low Duration Administrative Shs | 29,566.61 | 0.00 | 29,566.61 | 230,523.00 | Medium | | | | | | | |
| - Ira Regular | Pimco Real Return Class D | 29,566.61 | 14,349.55 | 15,217.06 | 230,523.00 | Medium | | | | | | | |
| - Ira Regular | Pimco Short Term Administrative Shs | 22,174.96 | 23,922.42 | 0.00 | 230,523.00 | Medium | | | | | | | |
| - Ira Regular | Pimco Total Return Administrative Shs | 29,566.61 | 0.00 | 29,566.61 | 230,523.00 | Medium | | | | | | | |
| - Ira Regular | Profunds Ultra Real Estate | 6,775.68 | 0.00 | 6,775.68 | 230,523.00 | Medium | | | | | | | |
| - Ira Regular | Rydex Titan 500 | 41,721.77 | 42,082.35 | 0.00 | 230,523.00 | Medium | | | | | | | |
| - Ira Regular | S_P 500 Depository receipt | 78,228.32 | 0.00 | 78,228.32 | 230,523.00 | Medium | | | | | | | |

Fig. 4b

|  | 701 |  |  | 702 |  |
|---|---|---|---|---|---|
|  | Client #1 |  |  | Client #2 |  |
|  | Trig Level | Liquidation % |  | Trig Level | Liquidation % |
| 703 Principal Protector 1 | 706 $97,000 | 707 15% |  | $95,000 | 25% |
| 704 Principal Protector 2 | 708 $95,000 | 709 50% |  | $91,000 | 75% |
| 705 Principal Protector 3 | 710 $93,000 | 711 100% |  | $85,000 | 100% |

Fig. 7

STOP-LOSS SYSTEM ENABLING A PLURALITY OF INVESTMENT PROTECTION LEVELS

CROSS REFERENCE TO RELATED APPLICATIONS

This application is a continuation of U.S. patent application Ser. No. 10/859,859, entitled "Real-Time Client Portfolio Management System", filed on Jun. 3, 2004.

This application cross-references U.S. patent application Ser. No. 10/000,000, entitled "Stop-Loss Trigger Utilizing a Dynamic Price Adjusting Feature", filed on July, 2004.

This application cross-references U.S. patent application Ser. No. 10/000,000, entitled "Method for Tracking and Predicting the Price of a Mutual Fund Prior to the Close of the Market", filed on July, 2004.

This application cross-references U.S. patent application Ser. No. 10/000,000, entitled "Method for Monitoring Cash Reserves and Determining Potential Investments for Purchase in an Automated Portfolio Investment System with Respect to a Target Portfolio", filed on July, 2004.

TECHNICAL FIELD OF THE INVENTION

The present invention relates generally to a method of dynamic financial investing and details a process for selling investments in an incremental manner based on conditions determined by the user of the invention methodology. The present invention relates more specifically to an improved stop-loss and trailing stop-loss order system incorporating multiple protection levels.

BACKGROUND OF THE INVENTION

There are numerous software packages monitored as Portfolio Management Systems available. Mainly, these systems focus on the accounting functions necessary to track transactions within an account, keep the accounts in balance and allow for the reporting of gains and losses. Some systems include additional features such as contact management, financial planning calculations and rudimentary security analysis. Some allow for model portfolios to be created and then applied to an account with reports that will show the difference between the two. These systems may include the ability to have the system generate the transactions necessary to convert the actual holdings to the model portfolio, but all of those systems assume the conversion happens at the same point in time. They do not allow for the gradual transition from the actual portfolio to the model portfolio over time based on a set of pre-determined factors.

Some existing systems (especially those with financial planning functions) include portfolio return estimates, but they rely on long-term historical returns for each of the underlying investment classes. They do not allow estimates and resulting portfolio management decisions to be based on an advisor's short-term, forward-looking estimates of market performance. The result is that historical returns can be far greater than those expected in the short-term and can overstate the estimated return.

No systems are available to the inventor's knowledge that allow for the automating of the investment purchase and sale process according to predetermined criteria that can vary from client to client. No systems are available to the inventor's knowledge that would monitor every investment in every client's account and compare those predetermined levels against real-time pricing data and signal an alert when that criteria is breached.

There are a few systems available that aid an advisor in making buy and sell decisions for an individual security based on technical indicators, but these systems do not provide a comprehensive portfolio management system that extends those decisions to numerous clients while allowing different settings for each client. The result is that the advisor would make a decision on the security as a whole and then process a buy or sell across all accounts holding that security. This process does not take into account the specific circumstances in each account, including when it was purchased and whether or not there is a gain or loss.

To the inventor's knowledge, none of the existing systems available provide for the ability to assign an action level to each investment in an account and then alert the advisor when that action level was reached. For instance, suppose a client invested $100 k in security X but said that if security X lost $7,257 that the advisor should sell it. In these situations the advisor would need to manually enter a stop-loss order at the associated share price. Existing systems do not provide this capability, especially for numerous action levels on each investment in every client's account. The result is that advisors are not able to provide a sophisticated level of service and monitoring of a client's accounts. This can result in additional losses to the client.

Numerous systems exist in the prior art for determining when to sell a real investment. Most of these pertain to short term investing and/or day trading. The most basic incarnation of this system is a stop loss order. These are orders placed with a broker when an investment is bought. These systems have varying features, but most buyers place a fixed share price threshold that will trigger an investment to be sold. This threshold is always a single amount, not a plurality of amounts with variable liquidation percentages. Some systems are even automated through a computer program to track the price of an investment and make the selling trade when a dynamic share price threshold is broken by the downward movement in an investment's price. This system is commonly referred to as trailing stop loss.

These systems fail to adequately protect long-term investors. Both work in the context of actual dollars that prevents the stop loss from changing proportionally with the investment as it grows in value. Take this example. A standard stop loss order is placed with the purchase of an investment. The investment was purchased at $100 per share. The stop loss was placed at $95 per share. The investment then grows to $150 per share. The stop loss would still be at $95 per share leaving the investor a potential loss of $65 per share before the stop loss would be activated. That system allows for too much potential loss. A trailing stop loss would perform better. Instead of a stop loss of $95 per share in the previous example the investor utilizes a trailing stop loss of $5 per share. That means that when the investment is priced a $150 per share the stop loss trigger would be $145 per share. When originally placed the stop loss was 5% of the price per share. When the investment reaches $150 per share the stop loss of $5 per share will only be 3.33% of the price per share. The shrinking difference as a percentage would become undesirable to an investor who wants to allow the investment room to grow.

An improved system would be dynamic, that is, changing with an investments high price per share. It would have a plurality of triggers and a plurality of liquidation percentages. It would also be proportional, that being a percentage of an investments price per share. The system would utilize time sliced data on an investments price from a communication medium such as the Internet and automatically adjust the plurality of triggers in real-time. The system would automatically sell an investment when conditions are met or trigger an alert for manual intervention.

All known stop loss systems in the prior art sell 100% of an investment when a stop loss is triggered. This is well adapted to short term investors but is not optimal for long-term investors. Long-term investors are willing to accept a greater price fluctuation for an investment. There are also possibly negative tax implications for selling 100% of any investment. An improved system would allow for plurality of stop losses with a plurality of liquidation percentages. However no stop loss system such as this exists to help better control the selling of investments.

SUMMARY OF THE INVENTION

A Portfolio Management System is a sophisticated means of automating the management of client's investment portfolios. A Portfolio Management System may be comprised of several distinct modules in a variety of configurations. The overall system provides for the use of financial planning and time value of money calculations to determine the growth rate needed for a client. A client can then decide that they want a higher or lower rate. The client's target growth rate (TGR) is then used to develop a target asset allocation designed to achieve the client's TGR. To accomplish this end, a Portfolio Management System uses the real-time management of multiple client portfolios with alerts when any individual security performs outside of pre-set tolerances.

A Portfolio Management System also has the ability to automate the buy and sell decision processes base on a predefined strategy. This results in the ability to transition from an actual client portfolio to a recommended portfolio based on market events over time. A buy and/or sell risk tolerance is assigned at the security, account and/or client level. The system then continuously monitors any existing investments, the balances of the accounts, and the variance between the actual and target portfolios and generates buy or sell alerts based on market movements. Portfolio Management Systems known in the prior art typically only create a single static floor level set at 100% liquidation for each investment. The Improved Stop-Loss System of the present invention enable a Portfolio Management System that may set a plurality of static floor levels with variable liquidation percentages.

Additionally, the Improved Stop-Loss System of the present invention may create a system that sets a plurality of dynamic proportional stop loss settings that may have variable liquidation percentages. The combination of these creates a preferred embodiment of the present invention that is effective at protecting an investor's principle and allowing it to grow.

The Improved Stop-Loss System of the present invention takes an investment and applies a series of triggers that define how the investment will be liquidated. These series of triggers are complex. The need for accurate pricing data, and the ability of the system to automatically sell percentages of and or complete investments necessitate a computing deviation that can communicate over the Internet or other similar communication medium. A set of instructions for the computing deviation required may vary in both length and content. A person skilled in the art will recognize that this system can be applied not only at the individual investment level but also at other levels such as class, sector, account, and client level.

BRIEF DESCRIPTION OF THE DRAWINGS

FIG. 4b is a screen shot of the a typical client buy list;

FIG. 7 is a table illustration two possible variations on utilizing a plurality of variable trigger levels to minimize investment losses;

DETAILED DESCRIPTION OF THE INVENTION

Figure 1:
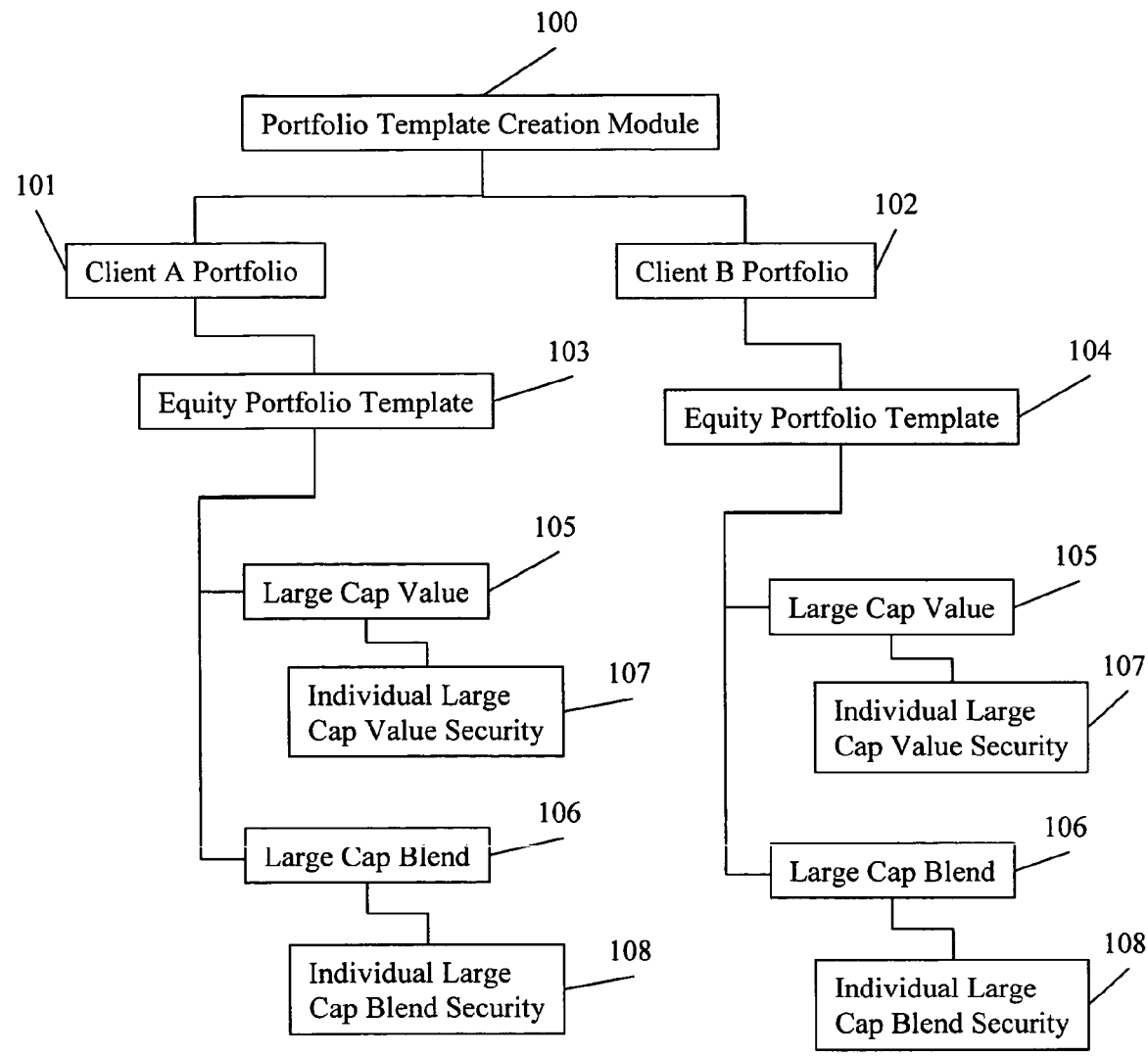
FIG. 1 is a schematic diagram that illustrates a typical portfolio management system known in the prior art.
Figure 2:
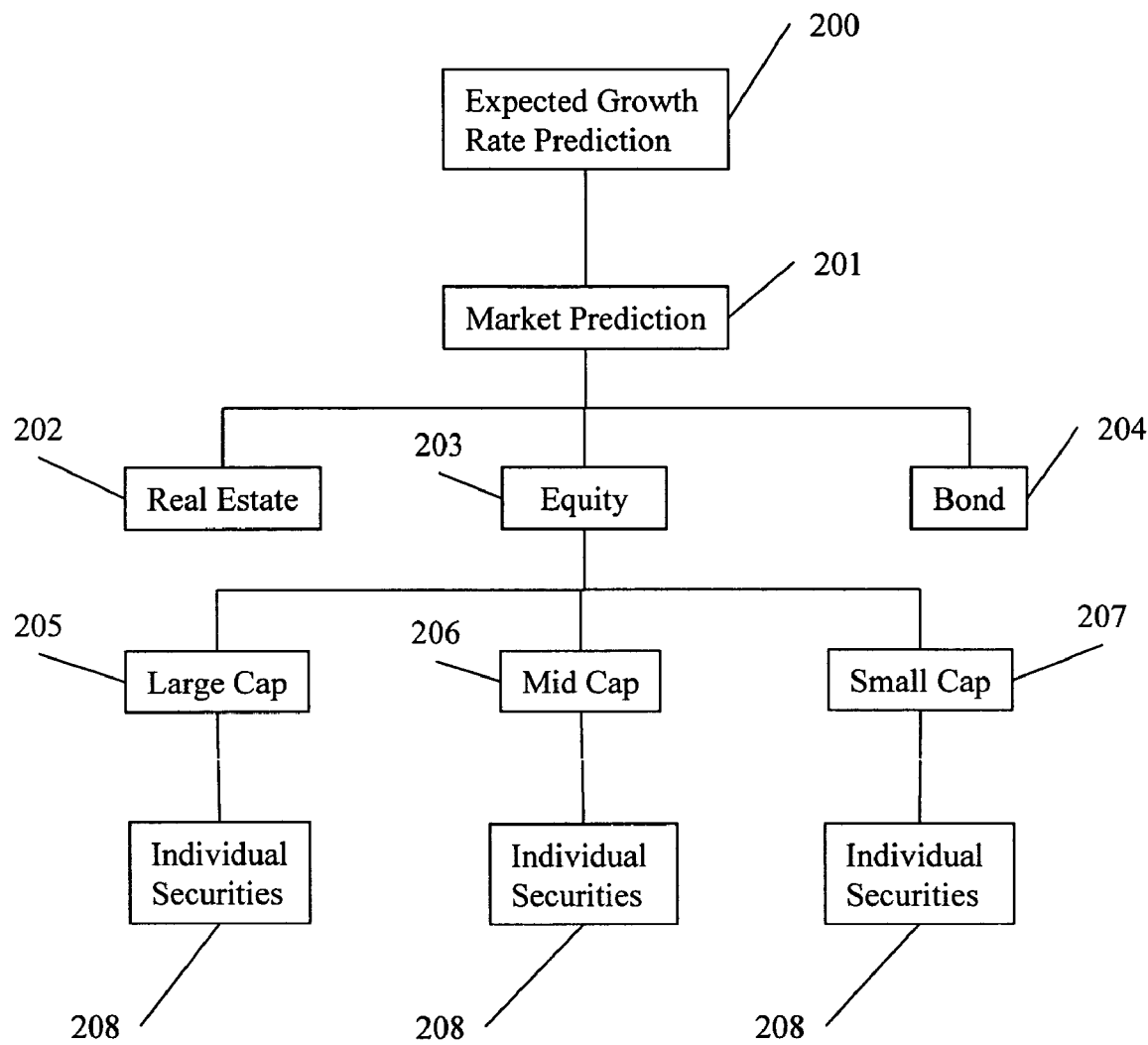
FIG. 2 is a flow chart illustrating the Expected Growth Rate system of the present invention.

In the following detailed description of the invention and exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known portfolio management and techniques known to one of ordinary skill in the art have not been shown in detail in order not to obscure the invention.

The Improved Stop-Loss System of the present invention is preferably used in a portfolio management system that allows for the real-time management of multiple client portfolios by an investment advisor, broker or agent. Within the industry, there are several software programs that facilitate the creation of an asset allocation for an account, software that allows the use of model portfolios and there may even be software that provides an indication of when a stock should be bought or sold. In the prior art nothing exists that combines all the elements necessary to effectively manage a large number of custom-tailored client portfolios on a real-time basis, checking to see if predetermined tolerances have been breached and/or generating the appropriate purchase and sale decisions at the individual client account level.

The portfolio management system preferably required by the Improved Stop-Loss System starts with a module (100) that allows for the creation of portfolio templates (103 and 104) that can then be used to create customized, individual portfolios for multiple clients (101 and 102). For instance, a portfolio template (103) can be created for equities that breaks down the percentage of each dollar allocated to it that should be invested in large cap value (105), large cap blend (106), etc. (various classes of investments). For each class, individual securities (107 and 108) can be selected and allocation percentages assigned to them. This is standard in the industry and familiar within the art. The system of the present invention allows for the creation of an unlimited number of portfolio templates.

One unique aspect of the allocation system of the present invention is the use of an Expected Growth Rate (200) (also referred to as EGR). At the beginning of each year (or any predetermined anniversary date), a prediction (201) of the expected growth rate for the various markets such as real estate (202), bonds (203), equities (204) is made. Then further break downs of the EGR (200) for classes such as large cap (205), mid cap (206), small cap (207), etc) and even assignments of an EGR (200) to individual securities (208) are created.

The use of the EGR allows the user to verify that an allocation designed for an individual client will allow them to reach a specific Annual Return on Investment (ROI). The use of the EGR also allows for comparison of the EGR of an existing investment (their Actual Portfolio) to the EGR of a Target Portfolio.

There are no other systems that employ an EGR approach based on a current prediction of market return in the prior art. Traditional allocation systems are based on long-term historical terms. The can be a significant difference expected results. For example, most analysts are predicting that the S&P 500 will grow about 8% in 2004. This is considerably lower than the long-term historical return of 10-11%. The use of an EGR in the current invention allows the user to better adjust portfolio allocations for current economic conditions.

Figure 3:
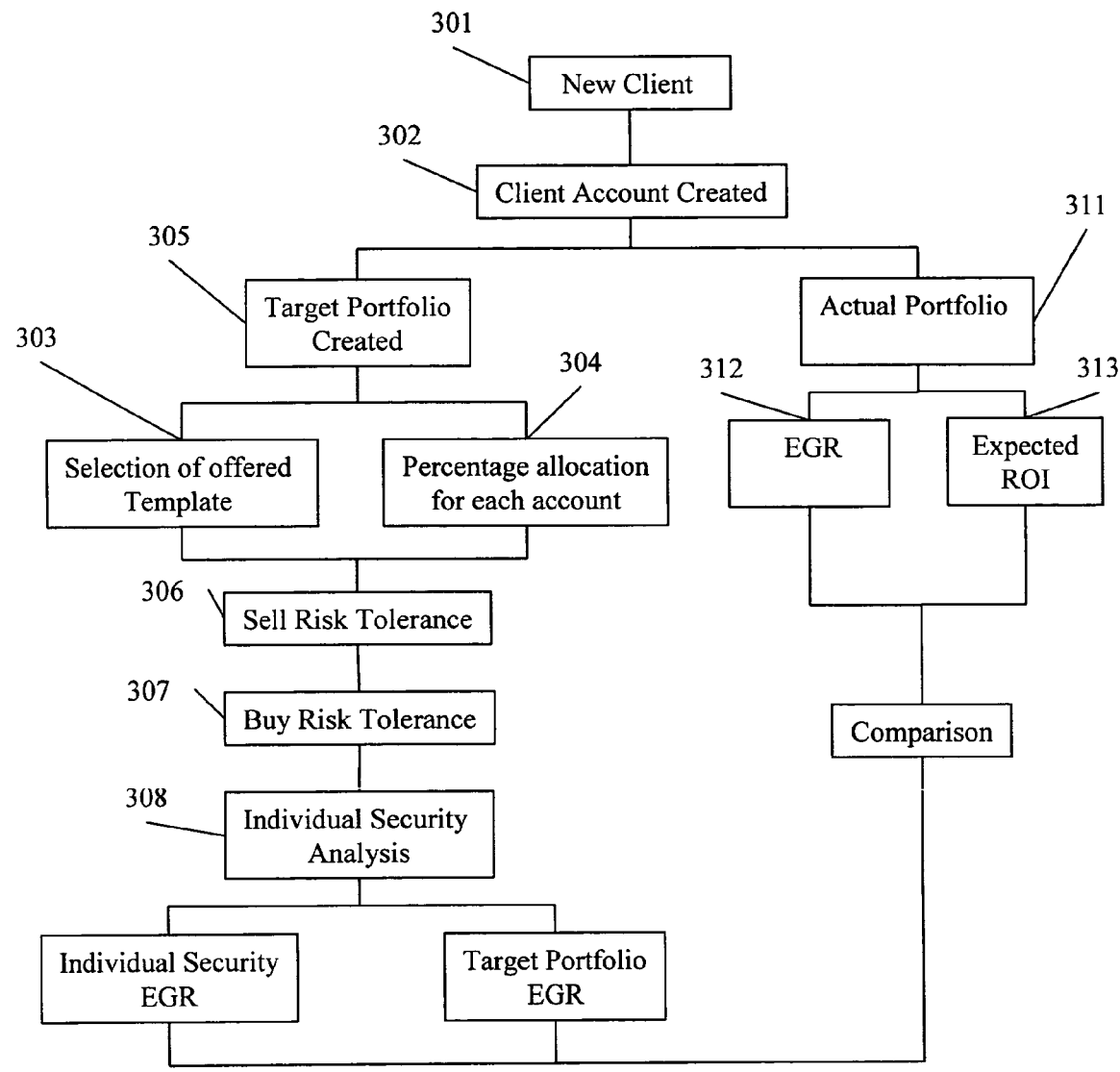
FIG. 3 is a flow chart illustrating the creating of a client account and corresponding Actual Portfolio and Target Portfolio.

Now referring to FIG. 3 a new client account (301) is set up in step 302 by creating a Target Portfolio (305) and assigning either one of a variety of predetermined templates (303) or percentage allocations (304). Once the client account (301) and Target Portfolio (305) are set up, an Actual Portfolio (311) is established for each client account (301). Additionally, a Sell Risk Tolerance (306) and a Buy Risk Tolerance (307) are assigned to each allocation (304) within both the Target Portfolio (305) and Actual Portfolio (311) of the client account (301). In step 308 the system looks at each individual security (309) in the underlying Target Portfolio (310) and computes the amount that should be invested in each individual security (309), computes the EGR for each individual security (309), and computes the EGR for the Target Portfolio (305). This can then easily be compared to the EGR of the Actual Portfolio (312) and the ROI desired (313). The EGR automatically adjusts based on changes in the settings related to the client, account or allocation buy and/or sell risk tolerance levels.

Figure 4A:
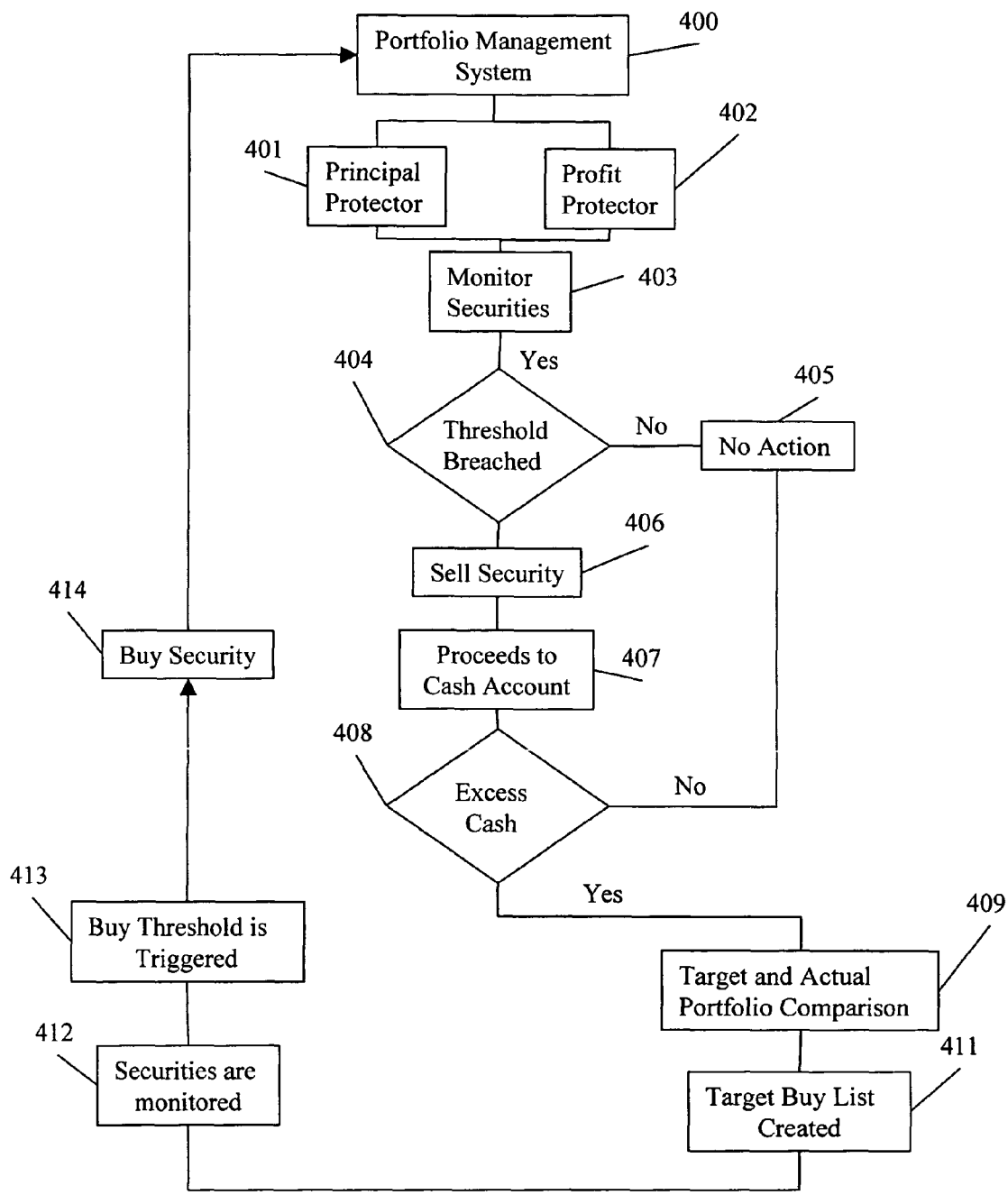
FIG. 4a is a flow chart illustrating the security monitoring of the present invention and allocation of excess cash after a sale.

Now referring to FIG. 4, instead of automatically selling the securities in the Actual Portfolio (311) and buying the securities in the Target Portfolio (310) (like other systems known in the prior art), the Portfolio Management System (400) of the present invention utilizes a two component principal protector system (401) and a profit protector system (402) to determine when a security should be liquidated.

These systems are designed to monitor (403) each security in each client account throughout the day and to trigger a sell alert when they breach a tolerance threshold (404). Thus, securities in the Actual Portfolio (311) are kept (405) until the system determines it is time for them to be sold (406). Securities can be sold manually based on data non-related to share price movements or at the user's discretion. When a security in the Actual Portfolio (312) is sold, the proceeds are moved into an interest-bearing cash account or a money market mutual fund (407). The Portfolio Management System actively monitors the level of cash in each account (408). When the level of cash exceeds the percentage of the account that is allocated to cash, the system recognizes that there is excess cash available (409). Once there is excess cash available within an account, the PMS compares the Target Portfolio to the Actual Portfolio to determine the specific securities and the amount of each that should be purchased (410).

Now referring to FIG. 4b which illustrates how the client buy list (450) would appear to a broker through a typical computer system, a security will not be added to a Target Buy List (411) unless (A) the actual percentage invested at the Category level is less than the percentage allocated to that Category in the Target Portfolio (460) (B) the actual percentage invested at the Class level is less than the percentage allocated to that Class in the Target Portfolio (461); (C) the actual amount invested (451) in that security is less than the amount allocated (452) to that security in the Target Portfolio (462); (D) the amount to purchase exceeds the minimum purchase amount required for that security (463) (can be manually overridden); and (E) pre-purchase technical indicators are met (464). This results in an account-level Target Buy List (450).

The system then begins active real-time monitoring (412) of each individual security on the account-level Target Buy Lists to determine based on user-defined technical indicators the optimal time it should be purchased. When that occurs, a Buy Alert (465) is sounded and the purchases can be executed automatically or manually by the user. Whenever a buy trigger threshold is triggered (413) a new security is purchased (414), money added to existing securities, etc, setting for the Principal Protector (401) and the Profit Protector (402) are automatically applied based on system defaults and continuously monitored. The PMS monitors the price fluctuations of each security in the system in real time or can use free delayed quotes from the Internet. The result is that it makes real-time decisions on the purchase and sale decisions.

Mutual finds, though, can only be bought or sold at the end of the day. A system that monitors the price movement of a mutual fund and sounds an alarm when a tolerance is breached would not be able to take action until the close of the following day. The result is that there could be an additional day's loss before the fund was sold. Likewise, if a buy signal were alerted based on that day's closing price, the purchase could not be made until the following day. The result could be increased losses and/or lost gains to the client. To prevent this, the present invention incorporates a unique Mutual Fund Predictive Module. The MFPM uses a proprietary mathematical algorithm that determines and monitors the correlation between any mutual fund and its assigned index. Then the system can predict, based on the changes in the related index, where that mutual fund will close at the end of the day and action can be taken before the market closes.

Mutual funds are priced at 4 pm daily. Any orders entered throughout the day receive the 4 pm price of the fund. The MFPM tracks the correlation of a mutual fund to an index, utilizes algorithms to determine the optimum numbers of days to average the correlation over and then predicts the price of the mutual fund prior to the close of the market based on the movement of the index. The system uses quality assurance methods to auto correct itself.

The inventor is not aware of any processes currently available or known in the prior art that provide for the prediction of where a mutual fund share price will close. Trading systems exist in prior art that provide general buy and sell recommendations for mutual funds.

Figure 5:
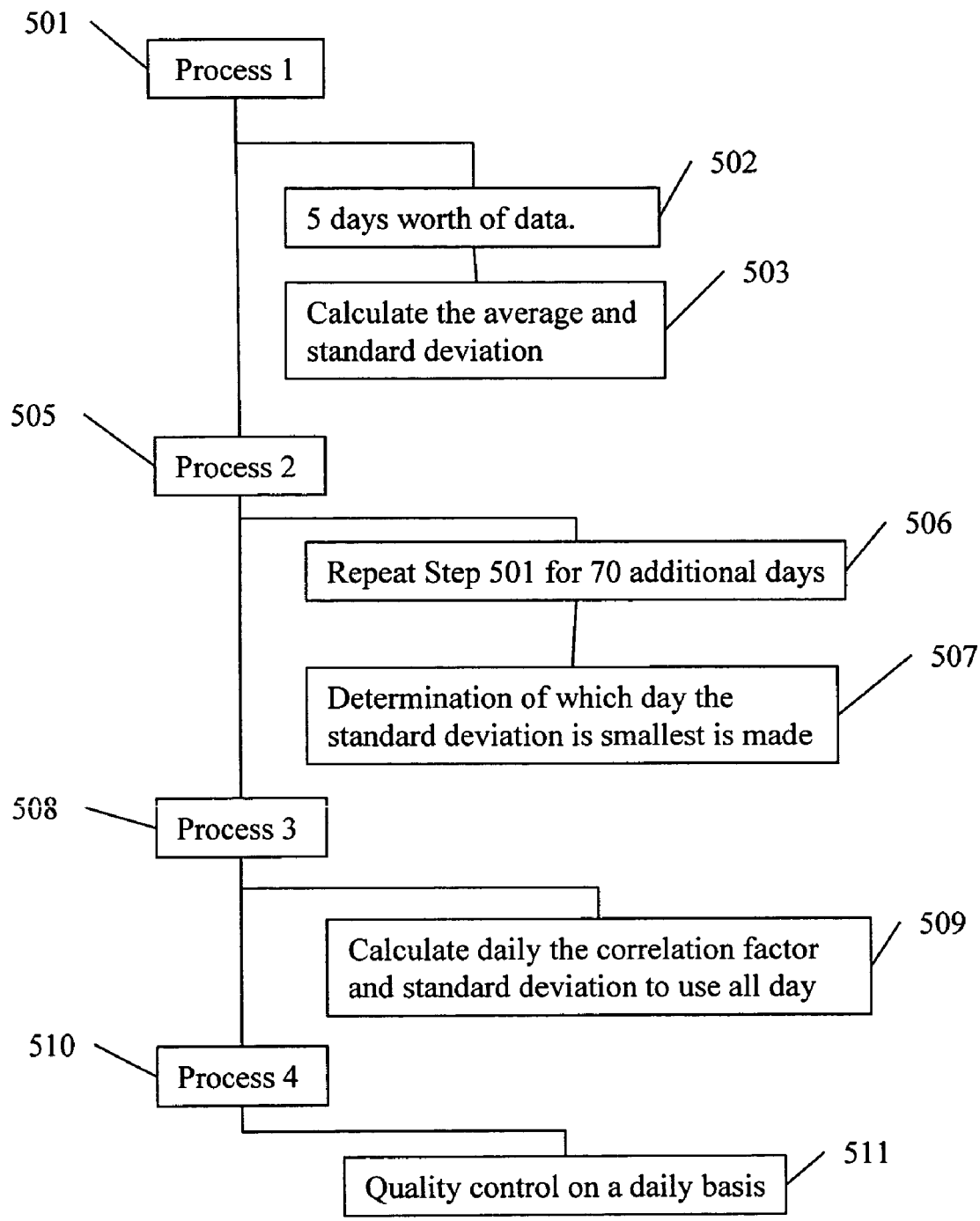
FIG. 5 is a flow chart illustrating the process of the Mutual Fund Prediction Module.

The MFPM, in FIG. 5, starting with Process 1 (501), in Step 1 (502): default to initially 5 days worth of data consisting of an Index Closing Price 1/MF Closing Price 1=Correlation Ratio 1 (CR1) which is then repeated for CR2 through CR5 for each initial day's worth of data. Next in Step 2 (503) the average and standard deviation of Step 1's data set is calculated. The result is a 5-Day Average and 5-Day Standard Deviation.

In Process 2 (505), Process 1 (501) is repeated for every day between days 5 and 75 (506), then a determination of which day the standard deviation is smallest is made with that day becoming the default day, default correlation factor (average) and default standard deviation (507).

On a Daily Basis, in process 3 (508) the MFPM uses the default number of days to complete Process 1 (501) that provides the correlation factor and standard deviation to use all day (509).

In process 4 (510) Quality control on a daily basis (511) is accomplished by using the last eight days of data points for actual mutual fund closing price (ACP) and predicted mutual fund closing price (PCP) and following the mathematical algorithm described in Table 1.

TABLE 1

MFMP Daily Quality Control Algorithms:

1 Using last 8 days data points (dp(i)) for actual mutual fund closing price (ACP) and predicted mutual fund closing price (PCP):
    a. If (PCP dp(i) > ACP dp(i) and
    PCP dp(ii) > ACP dp(ii) . . . dp(viii))
                   OR
    If (PCP dp(i) < ACP dp(i) and
    PCP dp(ii) < ACP dp(ii) . . . dp(viii))
                   then recalculate.
    b. If PCP dp(i) > 3 standard deviations away from ACP dp(i)
                   OR
    PCP dp(ii) > 3 standard deviations away from ACP dp(ii) . . . dp(viii)
                   then recalculate.
2. Using last 3 days data points for ACP and PCP:
    If (PCP dp(i) > ACP dp(i) AND PCP dp(ii) > ACP dp(ii) AND PCP dp(iii) > ACP dp(iii))
                   OR
((PCP dp(i) < ACP dp(i) AND PCP dp(ii) < ACP dp(ii) and PCP dp(iii) < ACP dp(iii))
                   AND
(2 out of 3 (PCP dp(i . . . iii) > 2 standard deviations from ACP dp(i . . . iii)))
                   then recalculate.
3. Using last 5 days data points for ACP and PCP:
If (PCP dp(i) < ACP dp(i) AND PCP dp(ii) < ACP dp(ii) . . . dp(v))
                   OR
(PCP dp(i) > ACP dp(i) AND PCP dp(ii) > ACP dp(ii) . . . dp(v))
                   AND
    4 of the 5 (PCP dp(i) > 1 standard
    deviation from ACP dp(i) . . . dp(v)
                   then recalculate.

The result is a complete Portfolio Management System that automates the management of client accounts. The Portfolio Management System actively monitors the Actual Portfolio and alerts when part or all of a security should be sold. Then Portfolio Management System determines, based on the Target Portfolio, which securities should be purchased (and amounts) and alerts the advisor at the appropriate time to make that purchase. Thus an advisor can provide a level of real-time portfolio management for numerous client accounts that currently does not exist in the marketplace today. Moreover, the system will modify the underlying decisions based on the progress an account and client have made toward their Desired ROI. The Portfolio Management System dynamically adjusts based on the actual results of the account compared to the target results (411) at the security, class, category, account and/or client levels.

The Improved Stop-Loss System of the Portfolio Management System of the present invention incorporates the principle protector system (401) and a profit protection system (402). The purpose of the principle protector is to meet investors' demands that advisor take action to protect their money if an investment they made begins to lose value. Investors also expect their advisor to take action and lock in profits on a security if an investment increases in value but then begins to lose value. The profit protection system enables the price of an investment to fluctuate but if the investment reaches a threshold loss, a sale will occur increasing the potential for profit.

The Principal Protector is an electronic monitoring system that monitors the protector levels of every investment for every account for every client in real-time and alerts the advisor when a tolerance is breached and action should be taken. Additionally, the system allows for a multitude of stop-loss levels to be set for each security and a liquidation percentage assigned to each. This allows for the gradual reduction of investment in a security should it decline in value while allowing the partial participation in growth should the security begin to appreciate.

Figure 6:
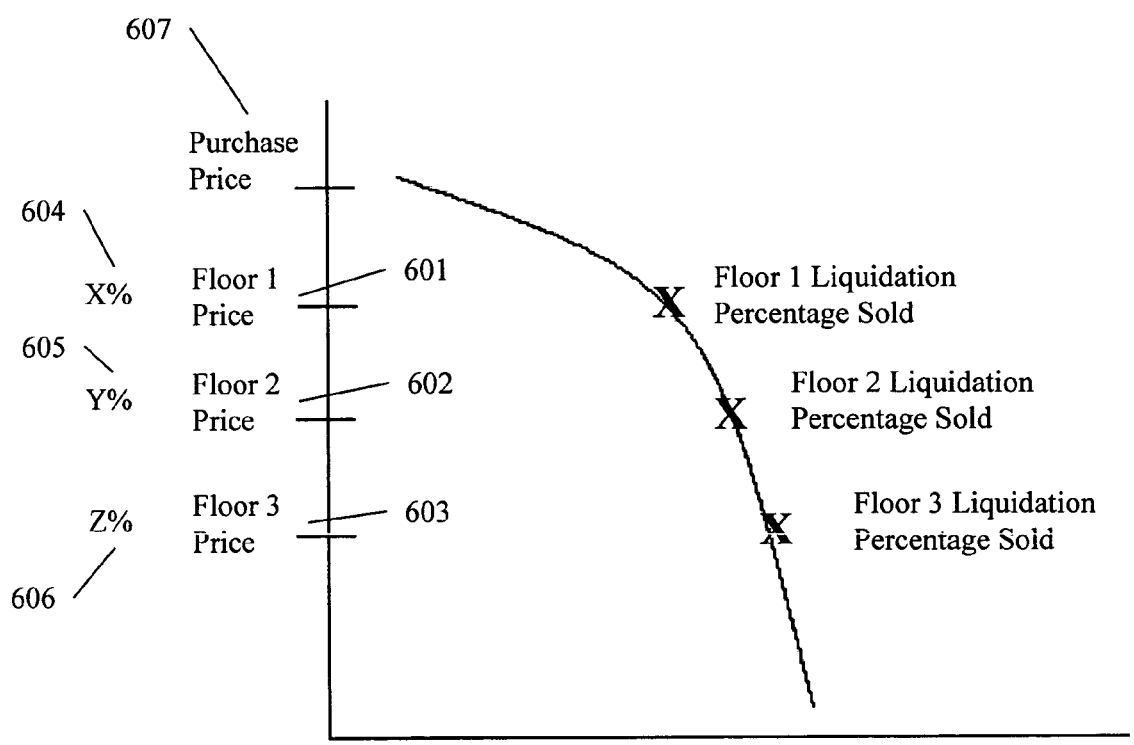
FIG. 6 is a flow chart illustrating the floor system that consists of a plurality of triggers and a plurality of liquidation percentages that provide static protection from a real investment's drop in value.

Now referring to FIG. 6, the first step in the series is to create a plurality of floor values (601, 602, and 603) with a variable liquidation percentage (604, 605, and 606) corresponding to each floor value (601, 602, and 603). A floor value is defined here as a price per share below the original purchase price (607) per share. This is an example, in which the invention could consist of a plurality of floor values with variable liquidation percentages. The floor values are static, i.e. they do not change as the value of the investment changes.

If a client invests $100 k in Investment A and it starts to lose value at some point they would want it sold and the money moved to cash where it wouldn't fluctuate and could then be put to better use. The level at which the sale should occur will vary based on the clients risk tolerance. If an advisor has numerous accounts, it is close to impossible to watch every investment and to keep track of every clients stop loss level on each one. Additionally, the risk of selling an investment when it goes down is that, should the investment begin to go back up, you are not able to participate in future growth. Therefore, selling 100% when the investment drops to $95,000 eliminates the possibility of participating in future profits.

For instance, let's assume that using the example illustrated in FIG. 7 where Client #1 (701) and Client #2 (702) have their respective Principle Protector settings (703, 704, and 705) on an investment as illustrated. The portfolio management system of the present invention would monitor the real-time price of the investment and if the value of Client #1's investment dropped to $97 k (706) it would alert the advisor to sell 15% of his position (707). If the value continued to fall to $95 k (708), the system would alert the advisor again to sell 50% of the remainder of Client #1's position (709), and if the valued fell to 93% (710) the system would alert the advisor again to sell 100% (711) or the remaining holding of the security. An unlimited number of Principal Protector levels can be used, but the best mode of the principle protector system of the present invention utilizes three. Note that the Principal Protector settings do not fluctuate with the share price of the security. They remain static, but are adjusted for additions and withdrawals to an account.

Investors also expect their advisor to take action and lock in profits on a security if it begins to lose value. It is not uncommon to buy a security, have it increase in value only to drop back to where it started or less. The security should be given enough room to fluctuate so that it can grow, but should be sold and the gains locked-in if it breaks below its normal tolerance. Again, each client would need to be able to have his or her own tolerance level.

The problem is that an advisor does not have the ability to efficiently monitor these levels for numerous clients. The advisor can place a stop loss order. Unfortunately the stop loss order is static so if the price of the stock moves up the stop loss order would have to be canceled and another one entered in, etc, etc. This would have to happen on every security of every client. It would be physically impossible. As a result, clients can quickly see their profits go down the drain because the advisor failed to take action.

The Profit Protector module provides an advisor with this flexibility and then some. In its most basic sense, the Profit Protector allows there to be a trailing stop loss (trailing means it follows behind the share price as it goes up—but it can't go down—without user intervention) set for each investment of each account of each client. The system then monitors the price movements of the security in real time and will automatically increase the trigger price of the trailing stop loss (even fractions of a cent) as the share price increases. During the real time monitoring, the system is also checking to see if the trailing stop loss trigger level has been breached. If it has, the system can automatically execute the sell transaction or the advisor can be alerted to take action manually so that the profits can be locked in.

The use of a trailing stop loss is available in various systems designed for use by day traders and is well known in the prior art. Unfortunately, they are designed to liquidate 100% of a security and do not allow the investor to participate in any growth should the share price go back up. Just like the Principal Protector module, the Profit Protector module employs the use of multiple trailing stop loss levels with each having an associated liquidation percentage. That way, a position can be gradually liquidated if the security continues to decline in price. That provides for the opportunity to profit on the portion that hasn't yet been liquidated should the stock price go back up. Currently the portfolio management system of the present invention utilizes four Profit Protector levels.

Figure 8:
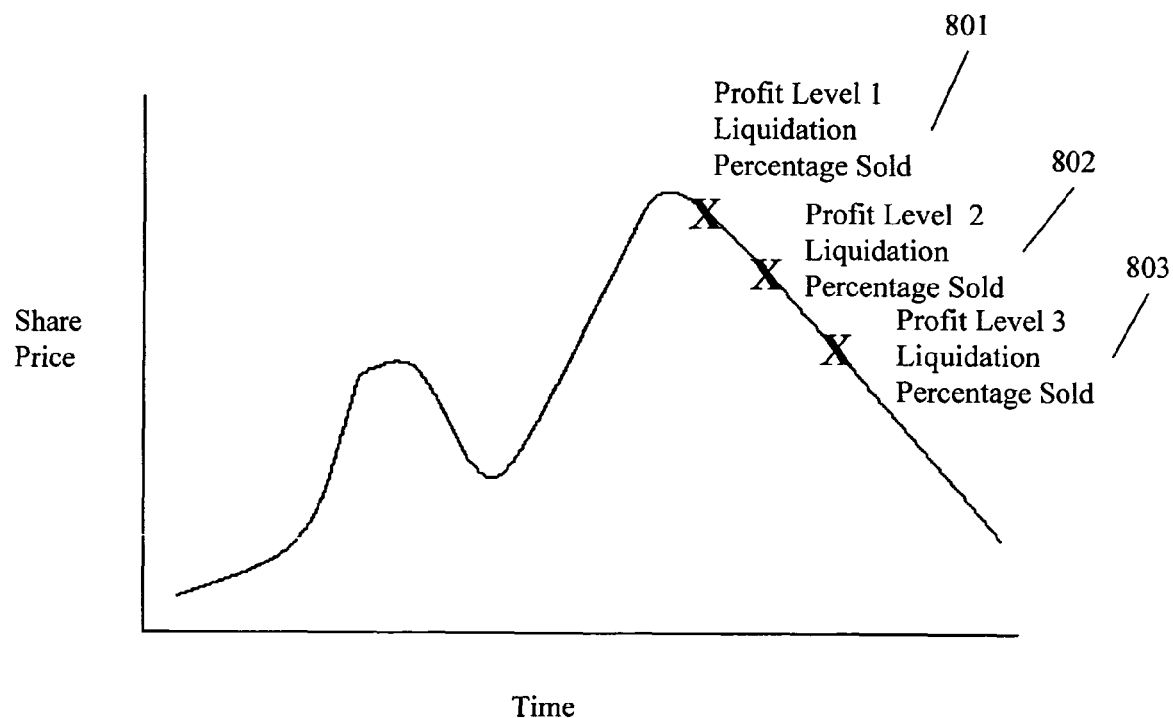
FIG. 8 is a flow chart illustrating the stop loss sales as a percentage of real investment holdings variable with a plurality of stop losses for a real investment.

Now referring to FIG. 8, Client 1 could set a trailing stop loss at 3% with 25% liquidation (801), 4% with 50% liquidation (802) and 5% with 100% liquidation. If the stock price were initially $10.00 per share the triggers would be set at $9.70, $9.60, and $9.50 respectively. If the stock went up to $10.01 per share the triggers would automatically increase to $9.7097, $9.6096, and $9.5095 respectively. Should the stock decline to $9.7097, the system would automatically execute the transaction or alert the advisor to sell 25% of the position. If the stock continued to decline (not time dependent) to $9.6096 the system would automatically execute the transaction or alert the advisor to sell 50% of the remainder of the position.

If the stock price then started to increase in value and went to $11 per share, the investors' remaining position would participate in that growth. As the stock price rose above $9.6096 the system would automatically reset trigger #2. If it continued to rise about $9.7097, the system would automatically reset trigger #1. From that point, the triggers settings would all adjust up as the share price increased. As part of the overall Portfolio Management System, a buy order in the same security might be triggered as each security increases in price so the effect can be to reduce a position as the price falls and add to it as it starts going back up.

In another embodiment of the Improved Stop-Loss System of the present invention a further enhancement on the stop-loss trigger method, the Dynamic Adjusting Module, allows a target growth rate to be set at the security, class, category, account and client level. Each of the tolerance settings of the Sell Trigger Module are then dynamically reduced real-time according to pre-defined criteria based on the performance of the security relative to the before mentioned target growth rates at each of five different levels. The result is that the greater a security performs the greater the profits are protected and it is completely adjustable based on the needs of the client.

The system is designed such that the trailing stop-loss and the stop-loss triggers do not overlap. In other words, each trailing stop-loss only becomes active when its trigger value is greater than the net invested.

There are two methods used to reactivate stop-loss and trailing stop-loss levels and their associated floor levels. The two ways this can be accomplished are as follows.

1. If the high point of the investment value upon which the activated trailing stop-loss were based was $10, all activated trailing stop losses would not be reactivated until the investment value was greater than or equal to $10.
2. Number trailing stop-losses 1-4 with 1 having the smallest trailing percentage value and the percentage value increasing from trailing stop-loss 2-4; and
   assuming that trailing stop-losses 1 and 2 were activated;
   (i) if trailing stop-loss 1 trailed the investment value by X %, trailing stop-losses 1 would be reactivated at that point in which the trigger value of trailing stop-loss 1 is X % below the investment value AND the trigger value of trailing stop-loss 1 is greater than or equal to the trigger value of trailing stop-loss 3
   (ii) if trailing stop-loss 2 trailed the investment value by Y %, trailing stop-loss 2 would be reactivated at that point in which the trigger value of trailing stop-loss 2 is Y % below the investment value AND the trigger value of trailing stop-loss 2 is greater than or equal to the trigger value of trailing stop-loss 3.
   (iii) in this way the protective corridor does not widen beyond the percentage value associated with trailing stop-loss 1.
   (iv) This process would be repeated until all activated stop-loss and trailing stop-loss levels have been reactivated.

The Dynamic Adjusting Module is a further enhancement on the Sell Trigger Module (STM). The existing STM consists of only one setting for each trigger value. Even though the STM allows for multiple dynamically adjusting triggers, each trigger is based on a percentage of the current price. The STM does not provide for the percentage of the current price to be dynamically adjusted based on performance criteria.

It would be an improvement on the STM to have the ability to dynamically adjust the percentage values in real-time based on a variety of performance-based criteria. This would allow the system to automatically reduce the amount a security would have to decline prior to a protective trigger breach based on predefined performance criteria.

In other words, when a security has an 8% return, a client might desire a protective level set at 4% so if the security dropped half of the gain would be locked in. On the other hand, if the security continued to increase in value, say it achieved a 12% return, the client might desire the protective level to narrow to a setting of 10%. Then, the protective level would trigger if the security return were to decline by only 2%.

A system with this capability would allow an investor to start with a wider protective setting initially to allow the position in that security the greatest opportunity for growth, while clamping down on the setting as the position had greater and greater returns. It is logical that the relationship of the actual performance to the expected performance could be one basis for such adjustment, but other criteria could be used.

For instance, instead of performance-based criteria, time-based or volume-based criteria could be used.

An additional improvement is the ability to dynamically adjust that amount of a security that would be liquidated based on performance-based criteria. This improvement would provide the capability for a greater percentage to be liquidated as the performance improved.

This improvement requires several additional data points. The new data points for each Profit Protector and Principal Protector Level are Trigger Price Wide (TPW), Trigger Price Narrow (TPN), Trigger Price Current (TPC), Trigger Liquidation % Wide, Trigger Liquidation % Narrow, and Trigger Liquidation % Current. So if there were 7 Protector levels, there would be 21 different settings. The Trigger Price settings use a share price whereas the Liquidation % settings state the percentage of the remainder that should be sold.

Additionally, there is a data point to determine when the dynamic adjustments should start (DAS) and a data point to determine when they should reach their narrowest setting or end (DAE). On each calculation cycle, a current price for a security is obtained and the Period-To-Date Performance Percentage (PP) is calculated. Once the PP is calculated, the Trigger Price Current setting is determined as follows:

---
If PP < = DAS Then TPC = TPW
If PP > DAS and PP < DAE
Then TPC = TPW − ((PP − DAS/DAE − DAS) X (TPW − TPN)
If PP > = DAE then TPC = TPN
---

For instance, based on the actual performance of Security X with these settings:

---
Trigger Price Wide (TPW) = 6%
Trigger Price Narrow (TPN) = 3%
Dynamic Adjust Start (DAS) = 5%
Dynamic Adjust End (DAE) = 9%
Period-To-Date Performance (PP) = 7%
---

At the beginning of the period, the Trigger Price Current (TPC) would be set to 6 (meaning a 6% decline in Security X's price before a sale was triggered). Real-time pricing info would be monitored and the return for the investment in Security X since the beginning of the period would be recalculated with each upward price movement. So, if PP=7, then TPC would be 4.5 and Security X would be liquidated at a 4.5% decline in price.

The same method is used to determine all of the appropriate current settings for both the price triggers and the liquidation percentages.

Multiple levels of criteria can be used to dynamically adjust the settings in real-time. This provides precise control over the overall function of the system. For instance, the PMS of said invention adjusts trigger settings according to the following schedule:

1) An individual security's triggers would be adjusted based on the PP of a security relative to that security's EGR
2) The triggers of all the securities in a Class of securities would be adjusted based on the PP of the Class relative to the Class EGR
3) The triggers of all of the securities in each Class of a Category would be adjusted based on the PP of the Category relative to the Category EGR.
4) The triggers of all the securities in an Account would be adjusted based on the PP of the Account relative to the Account EGR.
5) The triggers of all the securities of a Client would be adjusted based on the PP of the Client relative to the Client EGR.

The result is that the greater a Security, Class, Category, Account or Client performs the greater the profits are protected. It is completely adjustable based on the needs of the client. Without this levels-based logic, the return of one level could be eroded by the poor performance of investments in the other levels.

Once the DAM adjusts the current settings, the current price would be compared to the various Protector levels to determine if one has been breached. If so, the appropriate transaction would be automatically executed or the user alerted for manual decision. The user should be able to define the Performance Period. For instance, the PMS of said invention utilizes the calendar years as its Performance Period. Others may want to use Quarterly, Semi-Annual or multi-year time periods.

For the DAM to function properly, adjustments need to be made when transitioning from Performance Period #1 to Performance Period #2. These adjustments are:

1) In the STM, the Principal Protector settings are based on the net amount invested in a security. The Principal Protector protects that investment by automatically selling all or a portion should the value decline to the predetermined static level. In order for the PP1 returns to be protected in PP2, the Net Invested value should be increased to the current end of period value if the current end of period value is greater than the beginning of period value (Net Invested value). Then, the Principal Protector settings would be based on this greater amount and provide static protection for those gains.
2) At the beginning of a new period, the Current trigger settings should be reset to equal the Wide settings.
3) If there are any period performance to date values stored, they should be set to zero at the beginning of the period.

Therefore, the foregoing is considered as illustrative only of the principles of the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, the scope of the invention should be determined by the appended claims and their legal equivalents, rather than by the examples given.

The embodiments of the invention in which an exclusive property or privilege is claimed are defined as follows:

1. A portfolio management method recorded on computer-readable medium and capable of execution by a computer, comprising a sell trigger for controlling stop-loss and trailing stop-loss investment criteria wherein, providing a sell trigger utilizing a combination of one or more stop-loss and improved trailing stop-loss protection levels per investment for one or more investments;

applying multiple percentage based trailing-stop loss points to a investment in combination with stop losses;

establishing default settings based on the class of the investment and the risk tolerance of a client;

assigning automatically the stop loss percentages every time an investment is purchased;

providing the user the ability to edit each automatically assigned stop loss percentage individually, per investment, as needed;

providing a trailing stop-loss trigger values based on a percentage of the corresponding investments value;

requiring trailing stop-loss trigger values to maintain said percentage of investment value as investment value increases;

assigning liquidation values to each protection level so that said investment can be liquidated over time in increments as said protection levels are breached;

assigning an investment one or more static price protection levels that will remain inactive until breached, which will cause a corresponding value of said security to be sold;

assigning said investment one or more dynamic price protection levels that will remain inactive until breached, which will cause a corresponding value of said security to be sold;

varying the number of said static price protection and dynamic price protection levels from one investment to another;

varying a number of said static price protection and dynamic price protection levels for the same investments from client to client and account to account;

monitoring of said protection levels of every investment at the class, category, account and client levels for every account for every client in real-time automatically executes the transaction and alerts the advisor when a tolerance is breached and action should be taken; and liquidating a security incrementally should the market price continue to decline.

2. The portfolio management method of claim 1 wherein, the stop-loss and trailing stop-loss levels and said liquidation values of the sell trigger are completely adjustable based on the risk tolerance of the client.

3. The portfolio management method of claim 1 further comprising the step of optimizing the stop-loss and trailing stop-loss levels and said liquidation values of the sell trigger for each individual security based on said individual security's historical price movements.

4. The portfolio management method of claim 1 further comprising the step of adjusting the stop-loss and trailing stop-loss levels of the sell trigger based on predetermined criteria.

\* \* \* \* \*